United States Patent [19]

Sattelmeyer et al.

[11] Patent Number: 4,465,813
[45] Date of Patent: Aug. 14, 1984

[54] THERMOPLASTIC COMPOSITION OF ACRYLIC COPOLYMERS AND CROSSLINKING AGENTS AND PROCESS FOR ITS PREPARATION

[75] Inventors: Richard Sattelmeyer, Wiesbaden; Heinz Schmelzer, Rümmelsheim; Richard Gutte, Frankfurt am Main, all of Fed. Rep. of Germany

[73] Assignee: Hoechst Aktiengesellschaft, Fed. Rep. of Germany

[21] Appl. No.: 498,833

[22] Filed: May 27, 1983

Related U.S. Application Data

[63] Continuation of Ser. No. 296,590, Aug. 27, 1981, abandoned.

[30] Foreign Application Priority Data

Aug. 30, 1980 [DE] Fed. Rep. of Germany ....... 3032707

[51] Int. Cl.$^3$ ................................................ C08F 8/42
[52] U.S. Cl. .................. 525/366; 525/329.4; 525/370
[58] Field of Search .................. 525/328.2, 329.4, 337, 525/366, 370

[56] References Cited

U.S. PATENT DOCUMENTS 3,769,254 10/1973 Anderson et al. .................. 525/366

Primary Examiner—Paul R. Michl
Attorney, Agent, or Firm—Charles A. Muserlian

[57] ABSTRACT

Thermoplastic composition having high cohesion and a reduced tendency to flow, based on a copolymer of ethylenically unsaturated monomers obtained by conventional methods in the presence of polymerization initiators and a chelating agent based on (A) a copolymer consisting of an alkyl ester of an α,β-ethylenically unsaturated mono- and/or dicarboxylic acid with 1 to 12 carbon atoms in the alcohol group, an amide of such an acid, unsubstituted at the nitrogen atom, one of these acids themselves and optionally another copolymerizable monomeric compound, (B) a metal-containing cross-linking agent, the metal atom being an element of the second, third or fourth group of the Periodic Table, and optionally (C) other additives acting as extenders and other conventional additives, and the preparation thereof by treating the copolymer (A) together with the cross-linking component (B) and possibly the other additives (C) in a mixing apparatus at 100° to 150° C., during which cross-linking of the copolymer occurs. The thermoplastic compositions may be used as thermoplastic and hot-melt adhesives, laminating adhesives, sealable coatings, adhesive or barrier layers.

10 Claims, No Drawings

THERMOPLASTIC COMPOSITION OF ACRYLIC COPOLYMERS AND CROSSLINKING AGENTS AND PROCESS FOR ITS PREPARATION

This is a continuation of Ser. No. 296,590 filed Aug. 27, 1981, now abandoned.

The use of thermoplastic compositions based on esters of acrylic or methacrylic acid and possibly other monomers polymerised in the composition, such as styrene, olefinically unsaturated nitriles and/or amides and other suitable compounds for the preparation of hot-melt adhesives, films or other thermoplastic substances has often been described. Disadvantages of these compositions are their low shear and peel strength under stress at elevated temperature and their cold flow at ambient temperature.

Attempts have therefore been made to improve these compositions by cross-linking such copolymers containing amide groups with a) formaldehyde or compounds which split off formaldehyde (cf. for example DE-A No. 20 58 664) and using b) compounds containing epoxide groups (DE-B No. 22 27 349). However, these cross-linking processes are difficult to carry out since the cross-linking agents cannot be homogeneously distributed in the thermoplastic compositions under the conditions required and accurate metering of the cross-linking agents is difficult to achieve, thus often leading to excessive or inadequate cross-linking of the products. insufficient cross-linking, however, prevents the desired increase in cohesion from being obtained, whereas excessive cross-linking causes gel formation and these compositions are then no longer workable.

Admittedly, copolymers free from acrylonitrile (the presence of which in copolymers has recently been recognised as undesirable for toxicological reasons) may also be reacted by the methods described above to form cross-linked products; however, the same problems arise with regard to the metering of the cross-linking agents.

From DE-A No. 24 16 991, solutions of pressuresensitive resins are known, having improved viscosity and good flow characteristics, these solutions containing organic solvents. The resin component consists of a copolymer obtained from (1) at least one monomer which contains a hydroxyl, carbonyl or enol forming keto group, (2) at least one monomer selected from acrylic or methacrylic esters of alcohols with 6 to 20 carbon atoms and (3) optionally a monomer which may be an α-olefin with 2 to 10 carbon atoms, vinyl esters of alkanoic acids with 3 to 10 carbon atoms, ethyl and methyl esters of acrylic and methacrylic acid, acrylo- and methacrylonitrile, styrene and vinyl chloride. This copolymer is mixed with a partial chelate ester of an orthotitanic acid ester, as the cross-linking substance. N,N-diacetonyl(meth)acrylamide is mentioned as an example of a compound with an enol forming keto group. This substituted unsaturated amide imparts entirely different properties to the copolymer, by virtue of its chemical nature. However, there are no problems of metering, since the mixtures are in solution.

The object of this invention is therefore to overcome the disadvantages described hereinbefore.

The invention relates to a thermoplastic composition having high cohesion and a reduced tendency to flow at normal or elevated temperatures, based on (A) 90 to 99.99, preferably 95 to 99.9 wt.-% of at least one copolymer of (a) 20 to 95, preferably 40 to 80 wt.-% of at least one alkyl ester of an $\alpha,\beta$-ethylenically unsaturated mono- and/or dicarboxylic acid containing 1 to 12 carbon atoms in the alcohol group, (b) 0.1 to 20, preferably 0.5 to 15 wt.-% of at least one amide, unsubstituted at the nitrogen atom, of an $\alpha,\beta$-ethylenically unsaturated mono- and/or dicarboxylic acid, (c) 0.1 to 15, preferably 0.2 to 10 wt.-% of at least one $\alpha,\beta$-ethylenically unsaturated mono- and/or dicarboxylic acid, and (d) 0 to 50, preferably 0 to 30 wt.-% of at least one other $\alpha,\beta$-ethylenically unsaturated copolymerisable monomeric compound, (B) 0.01 to 10, preferably 0.1 to 5 wt.-% of at least one cross-linking agent, which is a metal compound of an alkyl acetoacetate with 1 to 6 carbon atoms in the alkyl group or a metal compound of a dihydric alcohol with 2 to 6 carbon atoms wherein the metal atom is an element of the second, third or fourth group of the Periodic Table, wherein the proportions of (A) and (B) and (a) to (d) must add up to 100%, and optionally (C) other additives acting as extender and other conventional additives.

The invention further relates to a process for the preparation of the thermoplastic compositions.

Examples of carboxylic acids for components (a) to (c) of copolymer (A) include crotonic acid, itaconic acid, maleic acid and/or fumaric acid, and carboxyl group-containing monomers derived from styrene, but preferably acrylic and/or methacrylic acid.

The alkyl group in ester component (a) is, for example, a methyl, ethyl, propyl, butyl, hexyl, 2-ethylhexyl, decyl or dodecyl group and the isomers thereof.

Amides used as component (b) may be, for example, the mono- and/or diamides of the above-mentioned acids and the monoamides of the monoesters of the above-mentioned unsaturated dicarboxylic acids with 1 to 12 carbon atoms in the alkyl group, e.g. the alkyl esters mentioned above.

It is particularly advantageous if 2-ethylhexyl acrylate is used as component (a), either alone or in admixture with butyl acrylate, or if a major amount of more than 50 wt.-% of 2-ethylhexyl acrylate or a mixture thereof with butyl acrylate is used, in admixture with other esters. In this mixture of the two esters, the proportion of butyl acrylate may be up to 70, preferably from 10 to 50 wt.-%, based on 100 wt.-% of the esters. The term butyl acrylate also includes n-, sec-, tert.- or isobutyl acrylate, n-butyl acrylate being preferred.

Suitable compounds (d) include, for example, styrene, α-methylstyrene, the various vinyltoluenes, ethylene, vinyl acetate and/or vinyl chloride.

In a preferred embodiment of the thermoplastic compositions according to the invention, the product used as copolymer (A) is a product synthesised from (a) 55 to 65 wt.-% of 2-ethylhexyl acrylate, 15 to 30 wt.-% of butyl acrylate and 3 to 15 wt.-% of methyl methacrylate, (b) 2 to 10 wt.-% of acrylamide and (c) 0.3 to 5 wt.-% of acrylic acid.

The copolymers may be prepared by conventional methods, such as solution or substance polymerisation, block or graft polymerisation, in the presence of polymerisation initiators, possibly with co-use of chain regulators. The best results are obtained if copolymerisation is carried out in the presence of a solvent and then the solvent eliminated by distillation at elevated temperature, i.e. up to about 200° C., possibly under reduced pressure. Examples of polymerisation catalysts include, in particular, peroxides, such as di-tert.-butylperoxide, laurylperoxide, di-cumylperoxide, cumolhydroperoxide, tert.-butylhydroperoxide, tert.-butyl perbenzoate, tert.-butyl peroctoate, dibenzoyl peroxide, methyl ethyl ketone peroxide, either individually or in admixture, or azoisobutyrodinitrile, in amounts of 0.1 to 3, preferably 0.3 to 1 wt.-%, based on components (a) to (d). Solvents which may be used include, for example, aromatic hydrocarbons such as toluene and xylene and mixtures thereof with saturated hydrocarbons, such as cyclohexane or petroleum fractions, and/or alcohols, e.g. the various butanols. Since some solvents, such as aromatic hydrocarbons or alcohols, may act as chain stoppers, the choice of solvent used can influence the molecular weight or viscosity of the copolymers and hence of the hot-melt adhesives.

The copolymers mostly have a melting viscosity, measured at 180° C., of from 5000 to 100,000, preferably 10,000 to 50,000 mPa.s. They have a high thermal stability and can therefore be stored in the form of a melt at temperatures up to 200° C. and for periods of up to 72 hours without any significant change in viscosity, colour or other characteristics.

The metal atom in the cross-linking substance (B) may be, for example, zinc, magnesium, boron or titanium, but preferably aluminun. The amounts of from 0.01 to 10 wt.-% (calculated as 100% substance) refer to 100 wt.-% of components (A) and (B).

Component (C) is generally used in amounts of from 1 to 500, preferably 50 to 250 parts by weight, based on 100 parts by weight of the total components (A) and (B), but it is also possible to use smaller amounts.

The compositions may contain, as additives, natural resins such as balsam, rosin, tall oil, colophony and copal resins and modified resins derived therefrom. The resins may be modified with polyhydric alcohols, e.g. glycerol, pentaerythritol and glycols by esterification or by reaction with ethylenically unsaturated mono- and-/or dicarboxylic acids, e.g. those listed hereinbefore. It is also possible to use copolymers of esterified natural resins with styrene, the various vinyltoluenes or acrylic or methacrylic acid. It is particularly advantageous to use terpenephenol resins and colophony resins modified with phenolic resins.

The resins used as component (C) are generally added in amounts of 1 to 100, preferably 2 to 50 parts by weight, based on 100 parts by weight of the sum of components (A) and (B).

Synthetic resins such as hydrocarbon resins, e.g. based on dicyclopentadiene, cumarone, indene or the $C_4$ to $C_5$ or $C_9$ distillation fractions obtained in the petrochemical processing of petroleum may also be used. Other resins include those based on ketones such as acetone, methyl ethyl ketone and cyclohexanone which are obtained by reacting these compounds with formaldehyde.

As further additives (C), it is also possible to add plasticisers, e.g. those based on phthalic, adipic, sebacic, azelaic and phosphoric acid esters, in which the alcohol group has 1 to 13 carbon atoms. In addition, the phosphoric acid esters may be esterified with phenol or cresol. It is also possible to use plasticisers which react with copolymer (A) by means of a monofunctional reactive group, such as glycidyl ethers or long-chained monoisocyanates, and extender oils such as mineral oil.

As further additives C, it is also possible to add waxes such as lignite waxes or synthetic products based on olefins, e.g. polyethylene or polypropylene waxes and low-molecular polymerisation products of isobutylene, butadiene, isoprene, styrene, vinylethers, wherein the alkyl group contains 1 to 8 carbon atoms, vinyl esters wherein the fatty acid group contains 1 to 12 carbon atoms, vinyl cyclohexane or α-methylstyrene. Provided that they are compatible, it is also possible to use, as components of the mixture, thermoplastic rubbers such as those obtained, for example, by block copolymerisation of styrene, butadiene or styrene with isoprene.

Examples of substances selected from the range of bituminous products include, for example, crude, blown, oxidised or otherwise modified bitumens which are obtained in the treatment of petroleum or coal.

As additive (C) it is also possible to use fillers, e.g. inorganic products such as barium sulphate, calcium carbonate, calcium sulphate, magnesium silicate, calcium magnesium carbonate, aluminum oxide, powdered quartz, colloidal or highly dispersed silicic acids, which may be used alone or in admixture. It is also possible to use pigments, but they must have a high temperature resistance and should preferably belong to the category of inorganic products or highly stable organic compounds, such as phthalocyanine dyes. Fibrous materials with a reinforcing effect may also be co-used as extenders, e.g. asbestos or glass fibres and synthetic products such as polyester or polyamide fibres:

In the process according to the invention for the preparation of the thermoplastic compositions, the copolymer (A) together with the cross-linking component (B) and possibly the other additives (C) is treated in a mixing apparatus, e.g. at 100 to 150, preferably 125° to 135° C., whereupon cross-linking of the copolymer occurs. The mixing operation is stopped when a noticeable increase in the cohesion of the mixture has occurred and no further substantial increase can be detected; depending on the temperature used, this stage is generally reached after 1 to 15 minutes and, more particularly, after 5 to 10 minutes.

Kneaders or extruders may be used as the heatable mixing apparatus, whilst to improve the metering and mixing, the cross-linking agent is appropriately added in dilute form, e.g. as a mixture with one of the components (C) which is to be added, such as a resin, plasticiser or wax.

If the substances with a cross-linking effect are added directly to the thermoplastic compositions in batches, it may take a relatively long time to achieve thorough homogeneous distribution. This may partly be caused by steric hindrance to the mobility of a cross-linking molecule already bound to a polymer molecule with a functional group.

Consequently, in a preferred embodiment of this process, it is advisable to prepare a combination of the cross-linking agent and a synthetic resin which is thoroughly compatible with the thermoplastic composition, whilst this synthetic resin should not have a deleterious effect on the properties of the end product. Terpenephenol resins have optimum characteristics in every respect, since they are compatible, melt at low temperature (below 100° C.) and have a stabilising effect on oxidation, thanks to their phenol content. A combination of cross-linking substance and terpenephenol resin is easily mixed into the thermoplastic melt under the conditions of the process, since a cross-linking agent of this kind is highly fluid at a temperature of over 120° C.

Such cross-linking agents consisting of the cross-linking agents (B) and resin (C) are preferably prepared by melting the two components together in a ratio of cross-linking agent to resin of 0.5:99.5 to 50:50 parts by weight, preferably 5:95 to 30:70 at 100° to 120° C. After a homogeneous melt has been formed and then cooled, the cross-linking agent is ground to a fine powder and in this form is added to the thermoplastic melt in the kneader.

An alternative method consists in intensively mixing the finely ground components of the cross-linking agent (B) and resin (C) in the amounts stated and adding this cross-linking agent, consisting of a mixture of powders, to the thermoplastic melt in the kneader. In this case, homogeneous distribution in the thermoplastic is obtained by melting the resin particles in the vicinity of the particles of cross-linking agent.

The thermoplastic compositions according to the invention may be used as thermoplastic and hot-melt adhesives, laminating adhesives, sealable coatings, other adhesive or barrier layers, films and strips, e.g. for insulation in underground or overground structures, in foundations, roofs, domes or channels and as strips or beading in seams or joints. Moreover, compositions of this kind may also be used as a protective coating on metals, being applied directly or in the form of films. When used for this purpose, in addition to their resistance to thermal stress, they have the major advantage of providing protection against corrosion and having surprisingly favourable acoustic damping characteristics.

In the examples which follow, T represents parts by weight and % represents wt.-%, unless otherwise stated.

EXAMPLES (1a) Preparation of the copolymer

A mixture of 1 T of acrylic acid, 6 T of acrylamide, 9 T of methyl methacrylate, 60 T of 2-ethylhexyl acrylate and 23 T of butyl acrylate is copolymerised in a mixture of toluene, cyclohexane and isobutanol, using 0.5 T of di-tert.butylperoxide, at 100° to 130° C. The mixture of solvents is removed by distillation, finally at 180° to 190° C. under reduced pressure (over 50 mbar). The yield of polymer is more than 99%. The end product obtained has a melting viscosity of 45,000 mPa.s at 180° C. The glass transition temperature is −45° C.

(b) The copolymer 1a is placed in a heatable kneader and converted into a melt at 130° C. over a period of 20 minutes. 5.5 T of a cross-linking agent prepared from 0.5 T of aluminum ethylacetoacetate (70% dissolved in isobutanol) and 5 T terpenephenol resin by evaporation of the solvent, homogeneous melting, cooling and pulverising, are added to 100 T of the copolymer. After 5 to 10 minutes treatment at 130° C. in the kneader, the cross-linked copolymer is taken out and prepared for further testing.

2. Example 1 is repeated, except that the cross-linking agent specified therein is replaced by an aluminum butanediolate which can be obtained by reacting aluminum ethylacetoacetate dissolved in isobutanol with butanediol-1,4 and working it up to form a solid product. The aluminum butanediolate-1,4 is melted with a terpenephenol resin in a ratio of 1:10, then cooled and ground to a powder.

3. Example 2 is repeated except that aluminum butanediolate-1,4 is added directly to the molten copolymer cooled to a temperature of 130° C. in the kneader, without the addition of a terpenephenol resin.

COMPARISON EXAMPLE 1

A powdered cross-linking agent consisting of 5 T of terpenephenol resin and 1 T of epoxy resin (epoxy equivalent weight 450 to 525) is added to 100 T of copolymer 1a under the test conditions of Example 1, and after 5 to 10 minutes' treatment at 130° C. it is removed from the kneader.

COMPARISON EXAMPLE 2

0.04 T of paraformaldehyde are added in batches to 100 T of copolymer 1a after melting in the kneader. Despite slow and careful addition, an inhomogeneous product is formed containing gel particles; this product is unsuitable for further testing and is discarded.

The cross-linked copolymers obtained from Examples 1–3 and Comparison Example 1 are subjected to the following tests, together with the uncross-linked copolymer 1a (Comparison Example 3): A film 1 mm thick is prepared from the copolymers and test pieces are made therefrom.

(a) Creep test

The test piece, with an area of 15×15 mm, is placed with one side on a steel sheet (15 mm wide) and the other side is stuck to an overlapping strip of polyethylene terephthalate film. The test piece is suspended vertically and weighted with a 1 kg weight on the overlapping polyethylene terephthalate film and then subjected to shear stress. The test is carried out at 23° C. and at 50% relative humidity. The time taken for the weighted polyethylene terephthalate film to fall off is measured.

(b) Thermal deformation test

Test pieces produced from the films, each having an area of 30×25 mm (length×width) are stuck side by side on a steel sheet measuring 20×20 cm in a horizontal row, at a spacing of 15 cm from the lower edge of the sheet. The steel sheet with the test pieces on it is placed at an angle of 100° in a chamber heated to 120° C. and the test pieces are left at this temperature for 60 minutes. After this time, the distance by which the lower edges of the test pieces have moved downwards is measured.

(c) Film strength and elongation

Test pieces measuring 100 mm long by 15 mm wide are loaded, in a test apparatus, to measure the tear strength and tear elongation up to breakage of the material. In this way, the maximum film strength and breaking elongation can be determined.

The values obtained are given in the table which follows.

TABLE

| Examples | 1 | 2 | 3 | Comparison 1 | Comparison 2 | Comparison 3 |
|---|---|---|---|---|---|---|
| (a) Creep test (h) | 8 | 2½ | 8 | 2 | discarded inhomogeneous | 2 |
| (b) Thermal deformation test/flow distance in cm | 0 | 0 | 0 | 10 | — | over 12* |
| (c) Film strength (N) | 13 | 16 | 9 | ? | — | 8 |

| Examples | 1 | 2 | 3 | Comparison 1 | Comparison 2 | Comparison 3 |
|---|---|---|---|---|---|---|
| Elongation (cm) | 35 | 48 | 48 | 65 | — | 100 |

*after only 40 minutes.

As can be seen from the table, the cross-linked products according to the invention do not suffer any flow deformation at 120° C., by contrast with the very great flow undergone by the non-cross-linked copolymer (Comparison 3) and the epoxy resin cross-linking. Moreover, the cross-linked products according to the invention have a higher film strength and, as a result of their internal strength, have a lower breaking elongation than the two Comparison Examples 7 and 3. The higher internal strength of Examples 1 to 3 according to the invention is also clearly apparent in the longer testing times for the creep test, compared with the Comparison Examples.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

We claim:

1. Thermoplastic composition having high cohesion and reduced tendency to flow, comprising
   (A) 90 to 99.99 wt.-% of at least one copolymer of
      (a) 20 to 95 wt.-% of at least one alkyl ester of an $\alpha,\beta$-ethylenically unsaturated at most dicarboxylic acid which contains 1 to 12 carbon atoms in the alcohol group,
      (b) 0.1 to 20 wt.-% of at least one amide, unsubstituted at the nitrogen atom, of an $\alpha,\beta$-ethylenically unsaturated at most dicarboxylic acid,
      (c) 0.1 to 15 wt.-% of at least one $\alpha,\beta$-ethylenically unsaturated at most dicarboxylic acid, and
      (d) 0 to 50 wt.-% at least one other $\alpha,\beta$-ethylenically unsaturated copolymerisable monomeric compound,
   (B) 0.01 to 10 wt.-% of at least one cross-linking agent, which is a metal compound of an alkyl acetoacetate with 1 to 6 carbon atoms in the alkyl group or a metal compound of a dihydric alcohol with 2 to 6 carbon atoms, the metal atom being an element of the second, third or fourth group of the Periodic Table,
   wherein the proportions of (A) and (B) and of (a) to d) must add up to 100%, and
   (C) from 0 to 500 parts by weight, based on 100 parts by weight of the sum of components (A) and (B), of other additives acting as extenders and other conventional additives, the proportion of resins of component (C) being up to 100 parts by weight.

2. Thermoplastic composition as claimed in claim 1, comprising
   (A) 95 to 99.9 wt.-% of at least one copolymer of
      (a) 40 to 80 wt.-% of at least one unsaturated ester,
      (b) 0.5 to 15 wt.-% of at least one unsaturated amide,
      (c) 0.2 to 10 wt.-% of at least one unsaturated acid and
      (d) 0 to 30 wt.-% of at least one other copolymerisable monomeric compound,
   (B) 0.1 to 5 wt.-% of at least one cross-linking agent, whilst the proportions of (A) and (B) and of (a) to (d) must add up to 100%.

3. Thermoplastic composition as claimed in claim 1, wherein component
   (A) consists of
      (a) 55 to 65 wt.-% of 2-ethylhexyl acrylate, 15 to 30 wt.-% of butyl acrylate and 3 to 15 wt.-% of methyl methacrylate,
      (b) 2 to 10 wt.-% of acrylamide and
      (c) 0.3 to 5 wt.-% of acrylic acid.

4. Thermoplastic composition as claimed in claim 1, wherein copolymer
   (A) has a melting viscosity of 5,000 to 100,000 mPa.s at 180° C.

5. Thermoplastic composition as claimed in claim 1, which also contains (C) other additives acting as extenders and other conventional additives in an amount of 50 to 250 parts by weight, based on 100 parts by weight of the sum of components (A) and (B), and component (C) comprising at least one compound selected from the group consisting of terpenephenol resins and colophony resins modified with phenolic resins, the proportion of resins of component (C) being 2 to 50 parts by weight.

6. Process for the preparation of the thermoplastic composition as claimed in claim 1, wherein copolymer (A), together with cross-linking component (B) and (C) from 0 to 500 parts by weight referred to the sum of components (A) and (B), of other additives is treated and cross-linked in a mixing apparatus at 100° to 150° C.

7. Process as claimed in claim 6, wherein the temperature is 125° to 135° C. and the treatment time is 1 to 15 minutes.

8. Process for the preparation of the thermoplastic compositions as claimed in claim 6, wherein a finely powdered mixture of components (B) and (C) is fed into the thermoplastic melt in the mixing apparatus.

9. Process as claimed in claim 6, wherein the cross-linking agent (B) is at first melted with a synthetic resin (C) in the weight ratio 0.5:99.5 to 50:50, the melt is then cooled to solidify, ground to a fine powder and in this form is added to the thermoplastic melt in the mixing apparatus.

10. Thermoplastic and hot-melt adhesive containing a thermoplastic composition as claimed in claim 1.

* * * * *